(12) United States Patent
Vincent et al.

(10) Patent No.: US 8,900,773 B2
(45) Date of Patent: Dec. 2, 2014

(54) PROTON-EXCHANGE MEMBRANE FUEL CELL ELECTRODE STRUCTURATION

(75) Inventors: Remi Vincent, Grenoble (FR); Sylvie Escribano, Grenoble (FR); Alejandro Franco, Eybens (FR)

(73) Assignee: Commisariat a l'Energie Atomique et aux Energies Alternatives, Paris (FR)

( * ) Notice: Subject to any disclaimer, the term of this patent is extended or adjusted under 35 U.S.C. 154(b) by 81 days.

(21) Appl. No.: 13/639,874

(22) PCT Filed: Mar. 28, 2011

(86) PCT No.: PCT/FR2011/050665
§ 371 (c)(1),
(2), (4) Date: Dec. 5, 2012

(87) PCT Pub. No.: WO2011/128549
PCT Pub. Date: Oct. 20, 2011

(65) Prior Publication Data
US 2013/0071771 A1    Mar. 21, 2013

(30) Foreign Application Priority Data

Apr. 13, 2010  (FR) ..................... 10 52789

(51) Int. Cl.
| | | |
|---|---|---|
| *H01M 4/92* | (2006.01) |
| *H01M 4/88* | (2006.01) |
| *H01M 4/96* | (2006.01) |
| *B82Y 30/00* | (2011.01) |
| *H01M 8/10* | (2006.01) |
| *H01M 4/86* | (2006.01) |

(52) U.S. Cl.
CPC .......... *H01M 4/8605* (2013.01); *H01M 4/8828* (2013.01); *H01M 4/926* (2013.01); *B82Y 30/00* (2013.01); *H01M 2008/1095* (2013.01); *Y02E 60/50* (2013.01); *H01M 8/10* (2013.01); *H01M 4/8663* (2013.01); *H01M 4/96* (2013.01); *H01M 4/925* (2013.01); *H01M 4/8673* (2013.01); *Y10S 977/742* (2013.01)
USPC ........... 429/487; 429/479; 429/484; 427/115; 977/742

(58) Field of Classification Search
CPC ....... H01M 4/86; H01M 4/88; H01M 4/8605; H01M 4/8673; H01M 4/8828; H01M 8/10; H01M 4/925; H01M 4/96; H01M 4/926; H01M 4/8663; B82Y 30/00
USPC .................. 429/487, 479, 115, 484; 977/742
See application file for complete search history.

(56) References Cited

U.S. PATENT DOCUMENTS

| | | |
|---|---|---|
| 5,723,173 A | 3/1998 | Fukuoka et al. |
| 6,492,295 B2 | 12/2002 | Hitomi et al. |

(Continued)

FOREIGN PATENT DOCUMENTS

| | | |
|---|---|---|
| EP | 0945910 A2 | 9/1999 |
| EP | 1429403 A2 | 6/2004 |

(Continued)

OTHER PUBLICATIONS

International Search Report for PCT/FR2011/050665 dated Jun. 22, 2011.

(Continued)

*Primary Examiner* — Gary Harris
(74) *Attorney, Agent, or Firm* — Heslin Rothenberg Farley & Mesiti P.C.

(57) ABSTRACT

An electrode for an electrochemical system, such as a fuel cell, is formed by an active layer including: pores; at least one catalyst; at least one ionomer; and electrically-conductive particles. The catalyst content per pore ranges between 30 and 500 mg/cm$^3$ with respect to the pore volume.

15 Claims, 7 Drawing Sheets

(56) References Cited

U.S. PATENT DOCUMENTS

| | | | |
|---|---|---|---|
| 2006/0093893 A1* | 5/2006 | Matsuo et al. | 429/44 |
| 2008/0044697 A1 | 2/2008 | Hirashige et al. | |
| 2008/0090128 A1 | 4/2008 | Saito et al. | |
| 2011/0135836 A1* | 6/2011 | Hays et al. | 427/475 |

FOREIGN PATENT DOCUMENTS

| | | |
|---|---|---|
| JP | 9283154 A | 10/1997 |
| JP | 2005174768 A | 6/2005 |
| JP | 2009199987 A | 9/2009 |

OTHER PUBLICATIONS

Jeremy P. Meyers and Robert M. Darling, "Model of Carbon Corrosion in PEM Fuel Cells," Journal of the Electrochemical Society, 2006, vol. 153, Issue 8, pp. A1432-A1442.

Alejandro A. Franco and Mathias Gerard, "Multiscale Model of Carbon Corrosion in a PEFC: Coupling with Electrocatalysis and Impact on Performance Degradation," Journal of the Electrochemical Society, 2008, vol. 155, Issue 4, pp. B367-B384.

Yuyan Shao, Geping Yin and Yunzhi Ghao, "Understanding and approaches for the durability issues of Pt-based catalysts for PEM fuel cell," Department of Applied Chemistry, Harbin Institute of Technology, Harbin 150001, China and Department of Macromolecular Science and Engineering, Case Western Reserve University, Cleveland, OH 44106, USA.

Alejandro A. Franco, et al., "Impact of carbon monoxide on PEFC catalyst carbon support degradation under current-cycled operating conditions," Commissariat a l'Energie Atomique (CEA), DRT/LITEN/Departement de Transport et Hydrogene/Laboratoire des Compostants Piles a combustibles et Electrolyseurs, et de Modelisation (LCPEM)—17, Rue des Martyrs—38054 Grenoble cedex 9, France.

Takenaka, et al., "High Durability of Carbon Nanotube-Supported Pt Electrocatalysts Covered with Silica Layers for the Cathode in a PEMFC," Journal of Electrochemical Society, 2008, vol. 155, Issue 9, pp. B929-B936.

M.B. Ji, et al., "A Novel Antiflooding Electrode for Proton Exchange Membrane Fuel Cells," Journal of Physical Chemistry C, 2009, vol. 113, No. 2, pp. 765-771.

\* cited by examiner

A

B

PROTON-EXCHANGE MEMBRANE FUEL CELL ELECTRODE STRUCTURATION

CROSS REFERENCE TO RELATED APPLICATIONS

This application is a national stage filing under section 371 of International Application No. PCT/FR2011/050665 filed on Mar. 28, 2011, and published in French on Oct. 20, 2011 as WO 2011/128549 A1 and claims priority of French application No. 1052789 filed on Apr. 13, 2010, the entire disclosure of these applications being hereby incorporated herein by reference.

TECHNICAL FIELD

The present disclosure relates to the field of proton exchange membrane fuel cells, and more specifically to the structuring of the electrodes forming them.

Proton exchange membrane fuel cells, as current generators, have a wide range of applications.

BACKGROUND OF THE INVENTION

The operating principle of proton exchange membrane fuel cells (PEMFC) is based on the conversion of chemical energy into electric energy by catalytic reaction between the fuel (hydrogen) and the oxidizer (oxygen).

Membrane-electrode assemblies (MEAs), commonly called cell cores, form the base elements of PEMFCs. As illustrated in FIG. 1, the MEA is generally formed of a polymer membrane (electrolyte, 3) in contact with a catalytic layer (electrodes, 2) on both sides. The electrodes (anode and cathode) are thus separated by the electrolyte, which is insulating for electrons but however conducts protons. Current collectors (1) ensure the electron transfer at the external surface of the electrodes.

In the case of proton exchange membrane fuel cells, the electrolyte generally is a membrane formed of a cation exchange polymer, such as Nafion® (Dupont) or Aquivion® (Solvay).

The fuel used in proton exchange membrane fuel cells may be a gas such as hydrogen or a liquid, such as for example, an alcohol (ethanol, methanol, ethylene glycol).

For example, the following reactions illustrate the electrochemical reactions occurring at the electrodes in the case where the fuel and the oxidizer respectively are hydrogen and oxygen:

Anode: $H_2 \rightarrow 2H^+ + 2e^-$ (1)

Cathode: $O_2 + 4H^+ + 4e^- \rightarrow 2H_2O$ (2)

In this case, the global reaction thus is the following:

$H_2 + \tfrac{1}{2}O_2 \rightarrow H_2O$ $E°_{eq} = E°_{cathode} - E°_{anode} = 1.23\ V$ The electromotive force across the cell thus is 1.23 V in standard conditions.

At the anode, the decomposition of the hydrogen adsorbed on the catalyst generates protons $H^+$ and electrons $e^-$. The protons then cross the polymer membrane before reacting with oxygen at the cathode. The reaction of protons with oxygen at the cathode results in the forming of water and in the generation of heat.

Such electrochemical reactions are kinetically promoted by the presence of a catalyst forming the electrodes. Several materials may be used according to the type of reaction and of fuel, but platinum appears to be the most effective catalyst for most reactions and fuels. As already indicated, the catalyst may appear in the form of catalytic layers which are generally made of platinum nanoparticles supported on carbon aggregates.

The catalyst may be uniformly deposited by means of a catalytic ink on the membrane surface or on the diffusion layer. Such a catalytic ink is especially formed of the catalyst supported by carbon (platinized carbon), a carrier liquid, and a proton conductive polymer. The latter is generally of same nature as the electrolyte.

Document JP 2005174768 describes a composition for an electrode comprising a platinum-based catalyst, Nafion®, and carbon black.

Further, document EP 0945910 describes an electrode comprising a catalyst based on platinized carbon and an ionomer. The described active layer comprises from 0.01 to 5 mg of metal/cm² while the pore volume is from 0.7 to 1.3 ml/g.

Document JP 92835154 describes an electrode composition comprising an ionomer and platinized carbon. Further, this document specifies that it is preferably for pores, having a diameter greater than 0.1 μm, to have a volume at least equal to 0.4 cm³/g.

With a view to the use and the development of PEMFCs for the consumer market, it is essential to minimize phenomena of aging of the core of such cells.

The liquid water flooding of the cathode and the irreversible degradation of the cathode nanomaterials (carbon support and catalyst) are among the main phenomena taking part in the degradation of the cell performance.

The presence of water is essential for the proper operation of the PEMFC since it especially enables to maintain the conductivity of the proton conductive polymer present in the electrodes and in the membrane. It is generated at the cathode according to reaction (2) but may also be introduced by previous humidification of the gases. However, an excessive amount of water is prejudicial since it may cause the flooding of catalytic sites and thus a stopping of the cell by making the access of the gases to the reactive sites impossible.

Further, the irreversible degradation of the electrode materials essentially concerns the active cathode layer according to a well-known corrosion mechanism, particularly prejudicial for the cell. The catalytic carbon support at the cathode oxidizes according to the following reaction:

Reaction (3) is generally thermodynamically possible, given its low potential (0.2 $V_{/ENH}$) with respect to the cathode potential of a cell. It is promoted by the presence of liquid water.

This degradation is enhanced when the cell is submitted to power cycles (J. P. Meyers and R. M. Darling J. Electrochem. Soc., 153 (8), A1432, 2006).

On the other hand, the oxygen present at the anode is normally reduced by hydrogen in the anode compartment. However, the hydrogen which is present may be insufficient in stop/start phases, power cycles, the forming of water plugs, the stopping of the hydrogen supply. The oxygen then uses other proton sources and, in particular, those generated by the oxidation of the cathode carbon. The oxygen present at the anode thus acts as a proton pump and enhances the corrosion of carbon at the cathode.

The degradation of platinum at the cathode also contributes to decreasing the cell performances. One of the degradation mechanisms relates to the oxidation, the dissolution, and the recrystallization of platinum.

On the other hand, the degradation of the cathode carbon support may cause the separation of the platinum particles and go along with a decrease in the active surface area due to the agglomeration of platinum particles (A. A. Franco and M. Gérard J. Electrochem. Soc., 155 (4), B367, 2008; Y. Shao, G. Yin, and Y. Gao J. Power Sources., 171, 558, 2007). It is proportional to the density of platinum nanoparticles supported on its surface (A. A. Franco and M. Gérard J. Electrochem. Soc., 155 (4), B367, 2008).

Electrochemical aging is another platinum degradation mechanism which results in an increase in the size of platinum nanoparticles and thus in a decrease in the electroactive surface area and of the cell performances. The electrochemical aging is enhanced when the amount of local water around the nanoparticles increases, or when the distance between nanoparticle decreases, or when the particle size dispersion increases.

Various solutions have been provided to decrease the performance degradation of a PEMFC-type fuel cell during its operation.

The decrease or the suppression of the carbon corrosion at the cathode may thus be achieved by modification of the nature of the support carbon, by addition of carbon dioxide in the oxidizer gas (cathode), by introduction of carbon monoxide in the fuel gas (anode), or by using a protection layer.

The modification of the nature of the support carbon may be performed by using carbon supports more resistant to corrosion, such as carbon nanotubes, fullerenes, graphites, or by thermal processing of the carbon support.

The addition of carbon dioxide ($CO_2$) in the oxidizer gas (oxygen) at the cathode enables to displace the equilibrium of the reaction (3) to the left to thus slow down the carbon corrosion.

The introduction of carbon monoxide (CO) at the anode enables to limit the carbon corrosion at the cathode. Indeed, by reacting with the oxygen present at the anode, the CO limits the above-described "proton pump" (A. A. Franco, M. Guinard. B. Barthe, O. Lemaire, Electrochimica Acta, 54 (22) (2009) 5267).

The use of a non-conductive silica-based protection layer ($SiO_2$) on a carbon/platinum nanotube assembly has been provided (S. Takenaka, H. Matsumori, H. Matsune, E. Tanabe, and M. Kishida, J. Electrochem. Soc., 155 (9) (2008) B929). This layer aims at limiting the migration of platinum, and thus the forming of catalytic particle aggregates responsible for a decrease of the cell performance. This solution thus acts on the stability of the catalyst, but not on the carbon, which is already stable. It should be reminded that carbon nanotubes have a good stability regarding the corrosion of carbon. Further, the $SiO_2$ layer is formed on all the carbon/platinum nanotube systems by hydrolysis of 3-aminopropyl-triethoxysilane and tetraethoxysilane compounds previously mixed to the carbon/platinum nanotube systems.

Another way to decrease the degradation of PEMFCs comprises decreasing the cathode flooding phenomenon. Although the volume of the active layer can be decreased by depositing less platinized-carbon-based ink and thus less catalyst, this increases the cathode sensitivity to flooding. Several solutions have been provided to overcome this phenomenon.

Document U.S. Pat. No. 6,492,295 provides the deposition of hydrophobic resins at the surface of the catalyst particles to limit the forming of liquid water in the cathode.

Document U.S. Pat. No. 5,723,173 provides introducing into the active layer a carbon powder having previously been submitted to a hydrophobic processing based on the fluorocarbon polymer.

On the other hand, document US 2008/0090128 provides using a catalytic powder which, after having been dispersed in water (0.5 g for 20 g of water), has a pH at least equal to 6. This pH range makes the powder present in the active layer relatively hydrophobic.

Document US 2008/0044697 provides forming an active layer which is extremely resistant to wetting, by the introduction of silicon compounds.

The introduction of a hydrophobic oil, namely polydimethysiloxane, into the electrode pores has also been provided (M. B. Ji, Z. D. Wei, S. G. Chen and L. Li, J. Phys. Chem. C 2009, 113, 765-771).

All these solutions aim at increasing the hydrophobic character of the active layer. However, such processings may be subject to chemical degradation mechanisms after several hundreds of hours of use. Further, the introduction of an additional product may decrease the electrode porosity, and thus limit the diffusion of oxygen. The introduction of hydrophobic materials may further cause the absence of water close to the catalyst while its presence is necessary for electrocatalytic reactions, as well as for proton conduction.

The present invention overcomes all these disadvantages by providing a structuring of the electrode to limit the reversible and irreversible degradation of a cathode.

The flooding phenomenon and the carbon corrosion and electrochemical aging phenomena are thus decreased.

SUMMARY OF THE INVENTION

The applicant has developed an electrode enabling to decrease the catalyst content while maintaining or improving the properties of the proton exchange membrane fuel cell.

The present invention comprises maintaining a constant vacuum volume in the active layer, or catalyst layer, while decreasing the amount of catalyst. The thickness of the active layer is maintained constant while the catalyst rate decreases. This approach goes against that of those skilled in the art, which would tend to decrease the thickness of the active layer to decrease the amount of catalyst.

More specifically, the present invention relates to an electrode for electrochemical systems, such as fuel cells. Said electrode is formed by an active layer further formed of agglomerates. The active layer especially comprises pores, at least one catalyst, at least one ionomer, and electrically-conductive particles.

Said electrode is characterized in that the total volume of the pores present in the active layer ranges between 0.0005 $cm^3/cm^2$ and 0.0012 $cm^3/cm^2$ with respect to the geometric surface of the electrode, preferably 0.001 $cm^3/cm^2$.

"Geometric surface" means the flat surface of the electrode, without taking into account its pores or reliefs.

Typically, the thickness of the active layer forming the electrode according to the present invention ranges between 10 and 20 μm. It is generally formed by deposition of a catalytic ink according to methods known by those skilled in the art.

As indicated hereabove, the active layer further comprises at least one ionomer which is a material generally identical to that forming the separation electrolyte membrane. The main function of the ionomer is to convey the protons produced or consumed on the catalytic sites between these sites and the membrane. The ionomer is a proton conductor selected, preferably, from the group of perfluorosulfonic polymers especially comprising Nafion® and Aquivion®. The electrons produced or consumed by the reactions are conveyed via the carbon in the electrodes and via an external electric circuit from one electrode to the other.

The limitation of the flooding phenomenon is enhanced by the presence of ionomers in the micro- and mesopores. The ionomer, used on account of its proton conductivity, indeed has a strong water absorption capacity which remains essential in the operation and the structuring of electrodes according to the present invention.

The electrochemical reactions occurring at the electrode are kinetically promoted by the presence of a catalyst in the active layer forming said electrode.

Without this being a limitation, the catalyst is generally supported on carbon. It may be selected from the group especially comprising the following catalysts: PtRu/C, PtCo/C, Ru/C, Pt/C, Co/C, Mo/C, PtNi/C, PtCrCo/C, PtIrCu/C, and PtCoMo/C, and mixtures thereof.

Advantageously, the catalyst is platinum-based, and more advantageously still, the catalyst is platinum supported on carbon, namely platinized carbon. The catalyst supported on carbon advantageously is in the form of nanoparticles. Preferentially, the amount of catalyst, advantageously based on platinum, ranges between 0.03 mg/cm$^2$ and 0.25 mg/cm$^2$ with respect to the geometric surface of the electrode.

Typically, and without this being a limitations, in the case of platinum supported on carbon, the platinum weight represents between 5 and 30% of the platinized carbon.

Advantageously, the catalyst content per pore ranges between 30 and 500 mg/cm$^3$ with respect to the pore volume, more advantageously between 100 and 200 mg/cm$^3$.

Generally, the ratio of the catalyst content per pore to the pore volume is determined according to the nature of the catalyst.

The present invention enables to decrease the catalyst load with respect to the pore volume. The addition of electrically-conductive particles especially enables to decrease the amount of supported catalyst without modifying the volume of vacuum or of pores of the active layer.

Preferentially, the active layer of an electrode according to the present invention comprises electrically-conductive particles selected from the group comprising carbon black, carbon fibers, carbon nanotubes, or a mixture of these particles or any other conductive pigment. Other electrically-conductive particles may also be introduced into the catalytic ink used to form the active layer.

The present invention also relates to the use of an electrode such as described hereabove for the manufacturing of a cathode in electrochemical systems, such as fuel cells. It may also be used for the manufacturing of an electrode-membrane assembly (MEA) in electrochemical systems, such as fuel cells.

On the other hand, the present invention relates to a method for manufacturing an electrode such as described hereabove by deposition of a catalytic ink comprising at least one catalyst, at least one ionomer, and electrically-conductive particles. The electrically-conductive particles are advantageously selected from the group comprising carbon black loaded or not with platinum particles at different mass rates (between 5 and 70%), carbon fibers, carbon nanotubes, or a mixture thereof. Other electrically-conductive particles may also be introduced into the catalytic ink. This method enables to maintain the carbon/ionomer volume ratio constant whatever the composition of the catalytic ink, to induce a decrease of the ratio of the catalyst load to the pore volume.

The catalyst content may also be decreased by increasing the ionomer content or by decreasing the catalyst content in the catalyst supported on carbon.

The electrode structuring according to the present invention enables to keep a minimum pore volume at all structural scales (nano, micro, and meso) of the electrode, whatever the formulation or method parameters used to manufacture the electrode. In other words, the ratio of the catalyst load per pore to the pore volume is decreased.

This results in a better dispersion of the catalyst in each pore, with a further decrease of the ratio of the catalyst load to the ionomer volume. Accordingly, liquid water accumulates within the pores at all scales, thus enabling to decrease flooding effects and to improve the properties of oxygen transport to the catalytic sites of the electrode. Thus, the cell sensitivity to power requirement variations is limited. Further, due to the lesser liquid water accumulation, the degradation of the catalyst and of the carbon support is also decreased. The lower catalytic particle concentration also slows down the corrosion of the carbon support.

EXAMPLES OF EMBODIMENT

The foregoing features and advantages of the present invention will be discussed in the following non-limiting description of the following embodiments in connection with the accompanying drawings.

FIG. 3B illustrates an MEA according to the present invention containing less platinum than the MEA shown in FIG. 3A.

Six membrane-electrode assemblies (MEA [1] to [6]) have been prepared and tested.

The test results (response of the cell potential along time) are illustrated in FIGS. 4 to 9.

Figure 10:
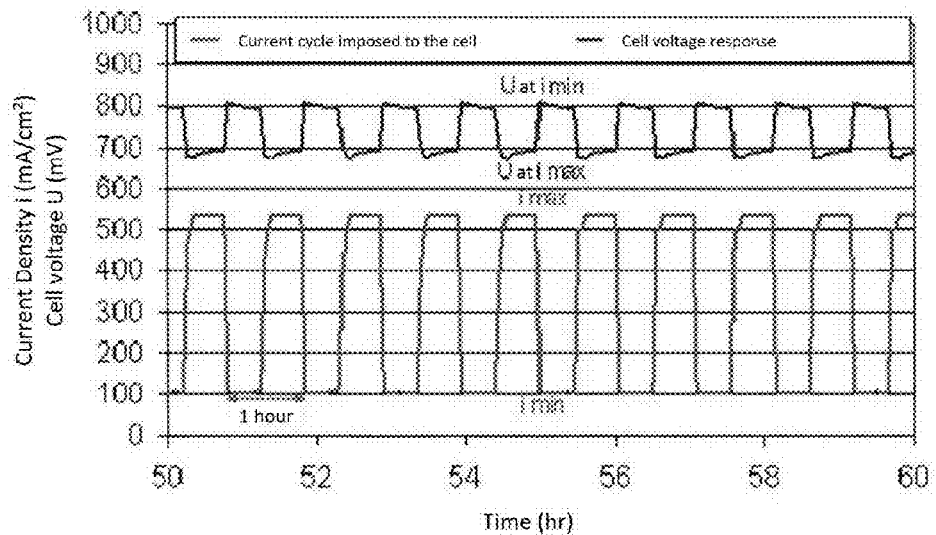

FIG. 10 shows the variation of the voltage and of the current density along time for a fuel cell comprising MEA [1].

Figure 11:
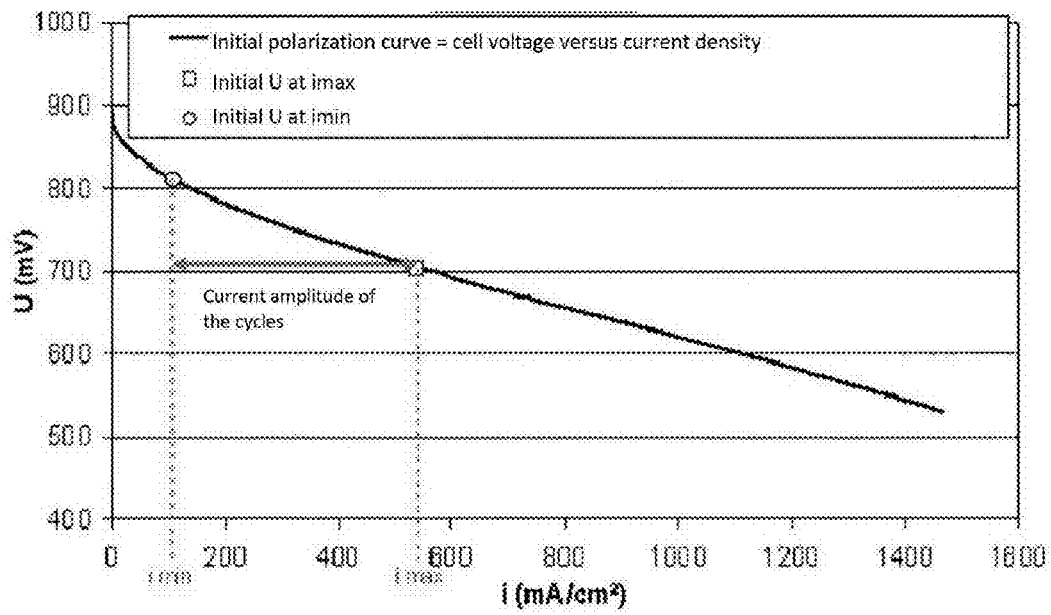

FIG. 11 shows the polarization curve of a cell comprising MEA [1]. The initial operating points correspond to the limits of the operating cycles.

Figure 12:
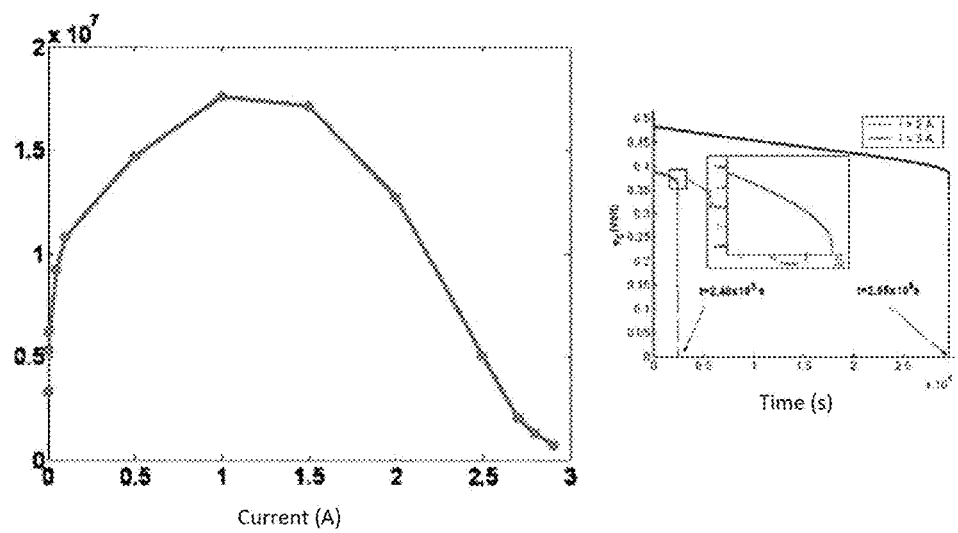

FIG. 12 shows the calculated variation of the cell core lifetime according to the nominal current (to the left) and an example of variation of the potential calculated for a fixed current (MEMEPhys model, to the right). The lifetime is defined as the time during which the potential dramatically decreases down to zero.

Figure 13:
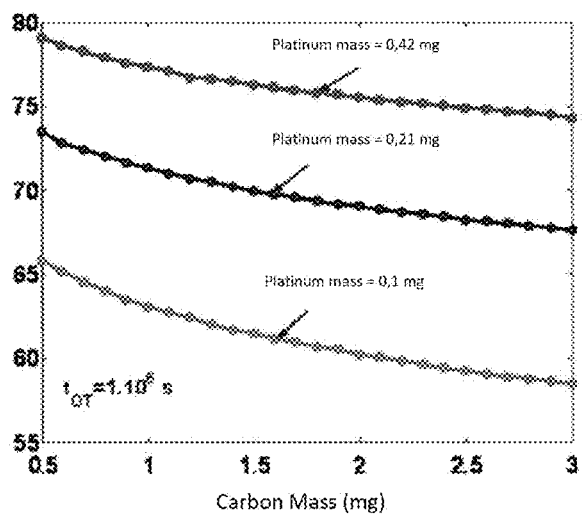

FIG. 13 shows the carbon mass lost after 300 hours of operation. This carbon loss is calculated according to the initial carbon mass for different platinum loads (MEMEPhys model).

The composition forming the catalytic ink especially comprises an ionomer, platinized carbon and, for MEAs [3], [5], and [6], carbon black. The ionomer is a proton conductive perfluorosulfonic polymer such as Nafion® (Dupont) or Aquivion® (Solvay). In all the examples discussed hereinafter, the total volume of the pores present in the active layer is 0.001 cm$^3$/cm$^2$ with respect to the geometric surface of the electrode.

Figure 1:
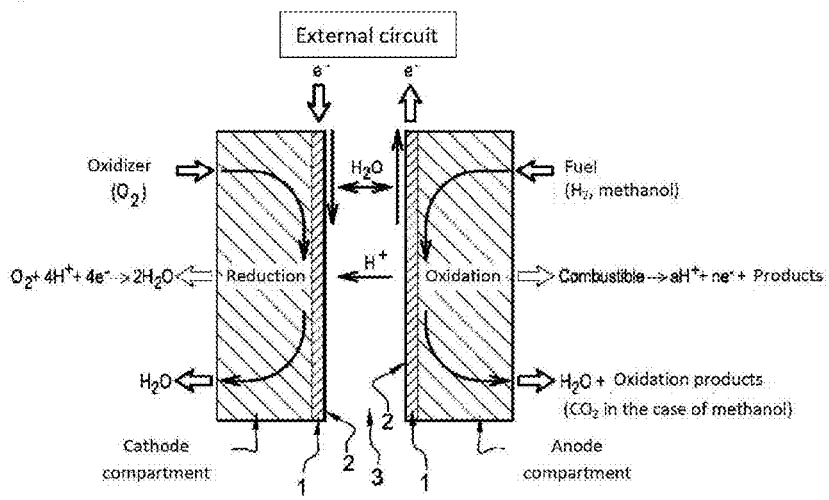
FIG. 1 shows the simplified operating diagram of a PEMFC fuel cell.
Figure 2:
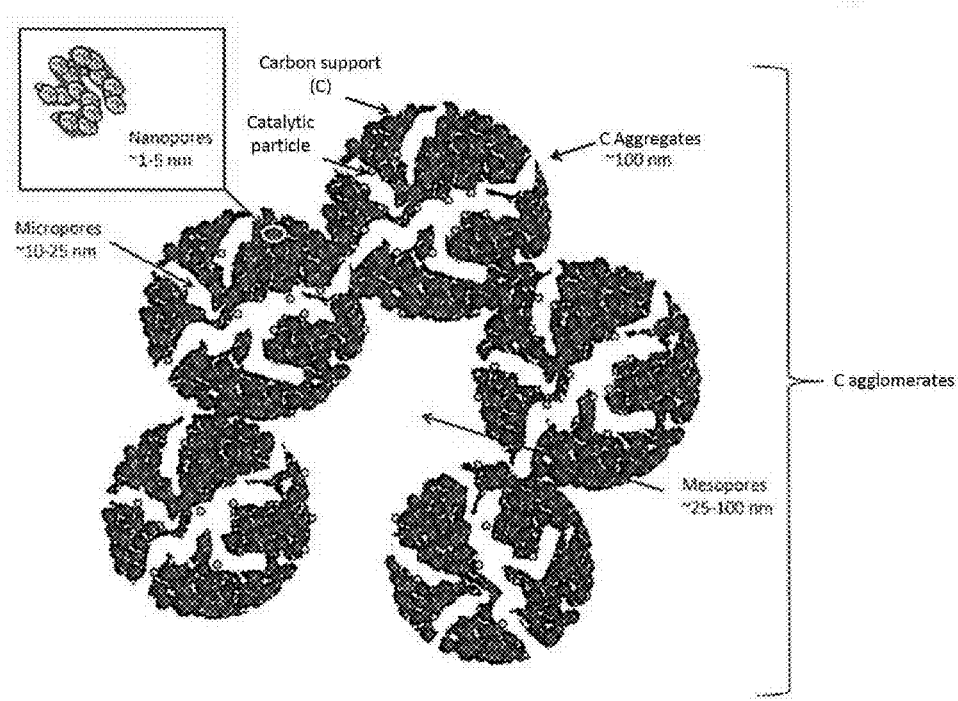
FIG. 2 shows the diagram of the structure of a PEMFC fuel cell electrode.
Figure 3:
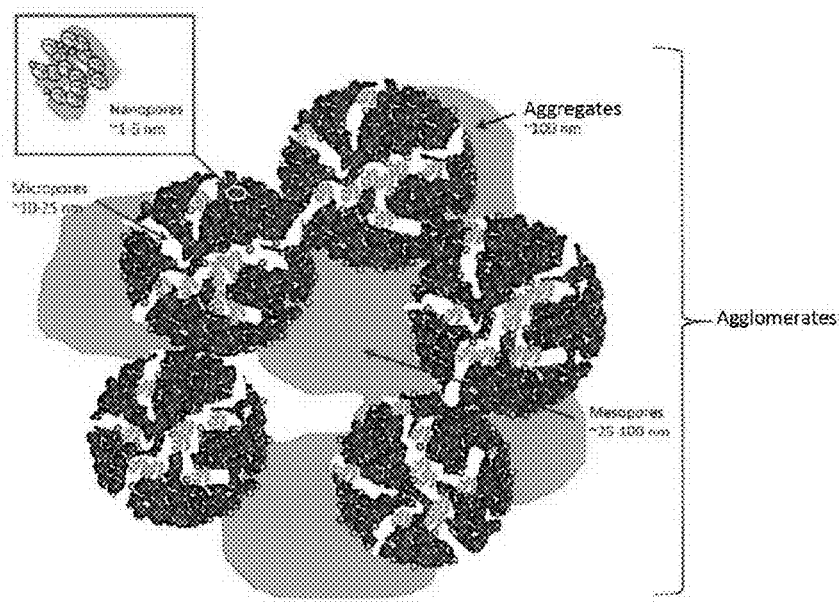
FIG. 3 illustrates the lesser capacity of an electrode according to the present invention to flood (B) and to cause the electrochemical aging of the catalytic nanoparticles and the degradation of the carbon support.
Figure 3:
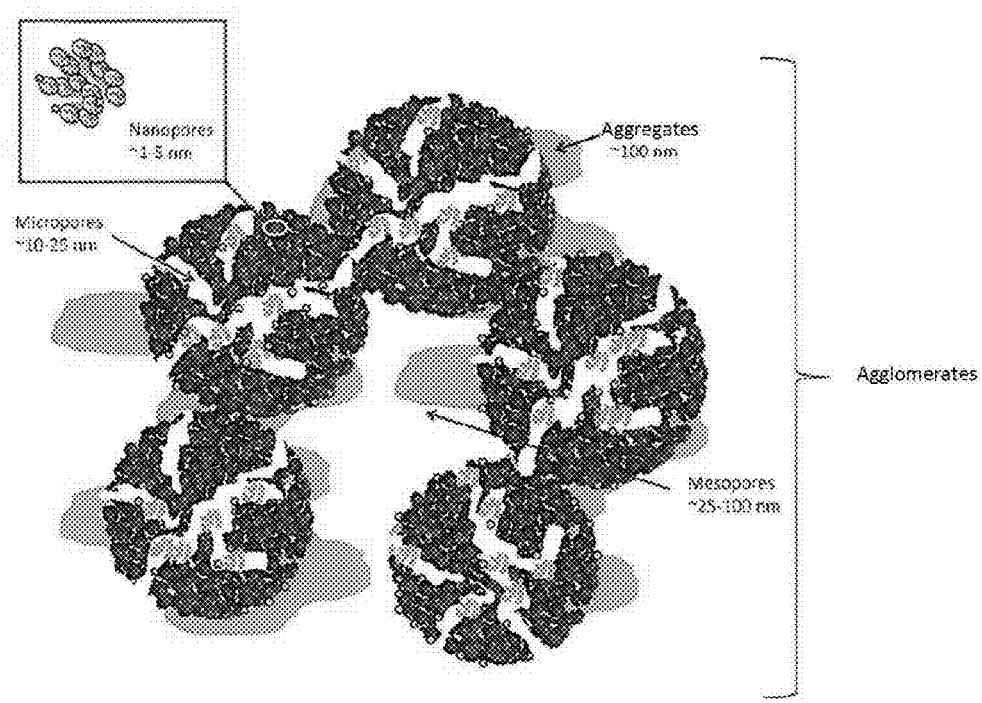
Figure 4:
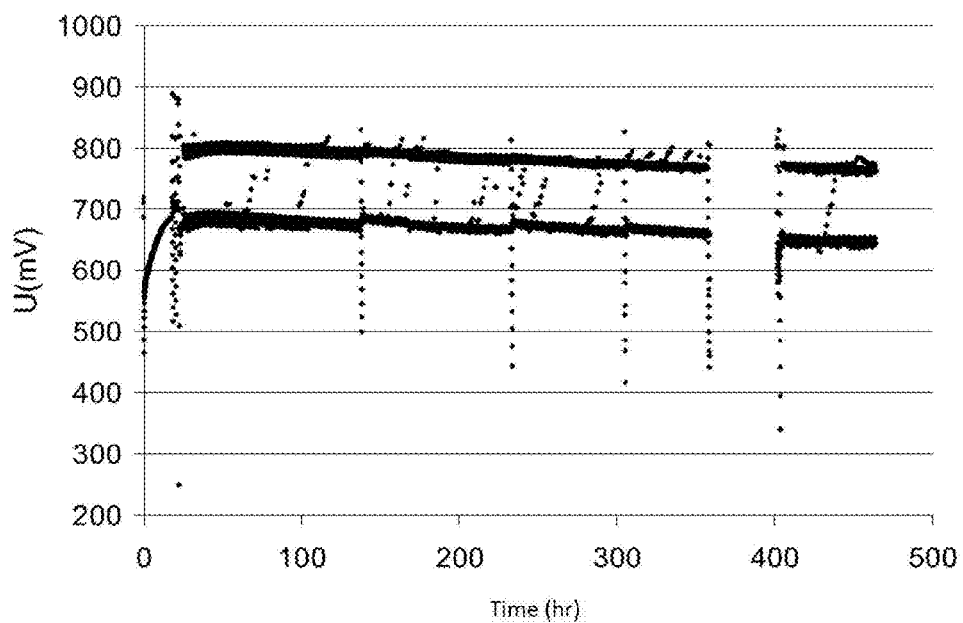

FIG. 4 shows the response of the cell potential to the operating cycles at high and low current intensities ($i_{max}$=540 mA/cm$^2$ and $i_{min}$=20% $i_{max}$=108 mA/cm$^2$) simulating an automobile-type operation for several hundreds of hours. This curve is obtained from MEA [1] loaded with 0.47 mg/cm$^2$ of platinum at the cathode with respect to the geometric surface of the electrode. A slight performance loss can be observed after 450 hours of operation. This performance loss is almost irreversible due to a stopping of the cell (regeneration cycle). The stopping being a phase recognized for its drying effect on flooded electrode areas (due to a self-distribution of the water in the MEA volume), this reveals a very light flooding. The irreversible performance loss is imputed, at the electrode level, to the irreversible degradation of the components due to the dissolution, the oxidation, or the electrochemical aging of the catalyst and to the corrosion of the catalytic support of the cathode.

Figure 5:
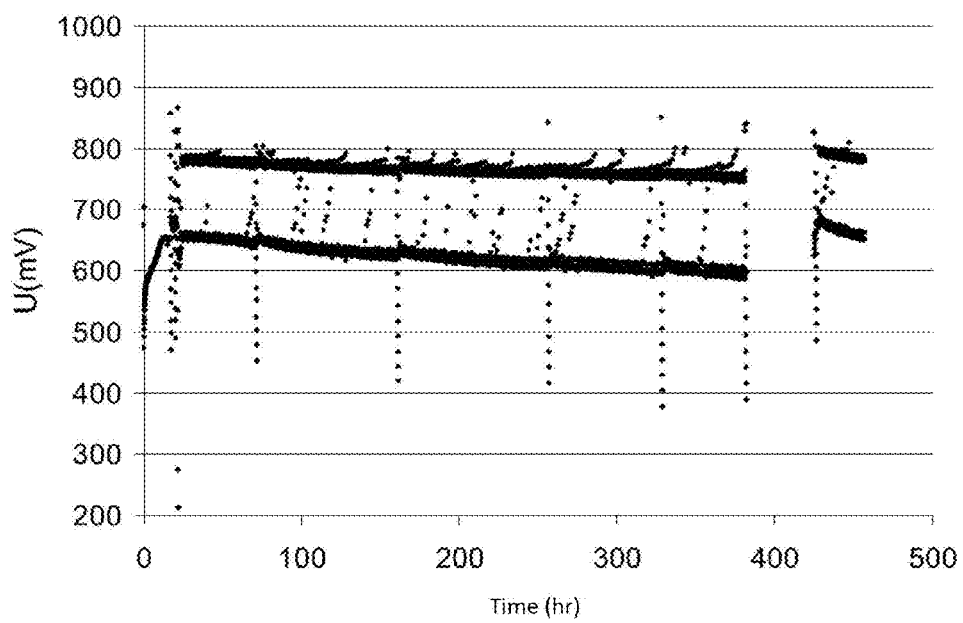

FIG. 5 shows the response of the cell potential to the same operating cycles with a MEA loaded with 0.17 mg/cm$^2$ of platinum at the cathode with respect to the geometric surface of the electrode, MEA [2]. It should be noted that the same catalytic ink and the same method have been used to form the two MEAs loaded with 0.47 (MEA [1]) and 0.17 mg/cm$^2$ of platinum at the cathode (MEA [2]), which implies that the pore volume of the cathode loaded with 0.17 mg/cm$^2$ (MEA [2]) is approximately 2.5 times lower than for a 0.47-mg/cm$^2$ load (MEA [1]). The study of FIG. 5 clearly shows a performance degradation, which is enhanced for high powers. It is highly reversible after a stopping with a performance regeneration, which is symptomatic of a cathode flooding. The irreversible performance loss is imputed to the same causes as for MEA [1].

Still to decrease the amount of platinum while keeping a high durability, an ink has been formulated to obtain a load of 0.17 mg/cm$^2$ of platinum at the cathode with respect to the geometric surface of the electrode (MEA [3]) with a vacuum volume equivalent to that of a cathode which would be practically three times more heavily loaded.

This ink is obtained due to the addition of standard carbon black into the ink (to keep the ionomer percolation, an addition proportional to the carbon black is performed).

Figure 6:
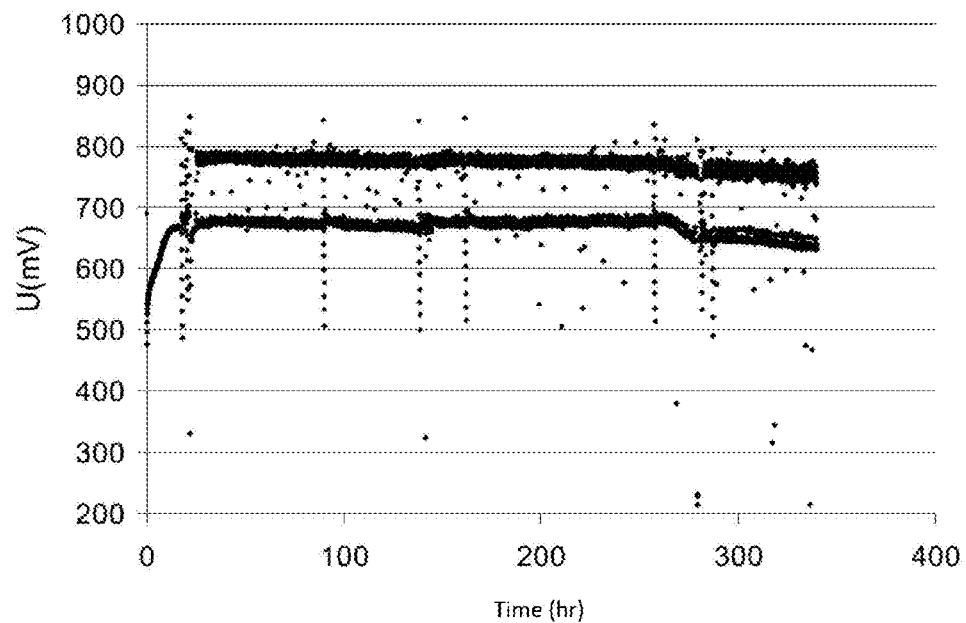

The curve of FIG. 6 shows the same operating cycles for MEA [3]. A study of this curve shows that its behavior is very close to that of MEA [1] loaded with 0.47 mg/cm$^2$ but with practically three times less platinum. This clearly indicates that, in this case, the durability of the performance, instead of being linked to the amount of platinum, depends on the ratio of the platinum load at the pore scale to the pore volume.

Two other MEA structures have been tested to validate the observations linked to the performance of MEA [3]. MEA [4] comprises a cathode formed of a platinized carbon catalyst having a platinum rate smaller than that used for previously-described MEAs [1] to [3]. The use of this new platinized carbon provides a cathode structure very close to that of MEA [3] (with no carbon added).

Figure 7:
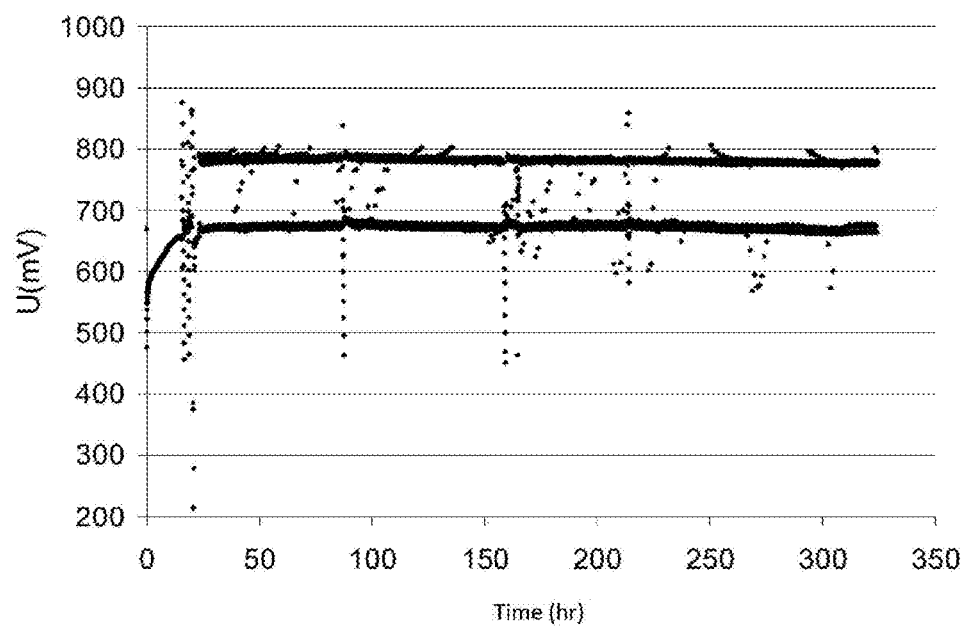

The study of FIG. 7 reveals a behavior of MEA [4] similar to that of MEA [3]. This enables to conclude that, more than the exact formulation of the active layer, the ratio of the platinum load at the pore scale to the pore volume is the quantity with which the performance durability can be improved.

Figure 8:
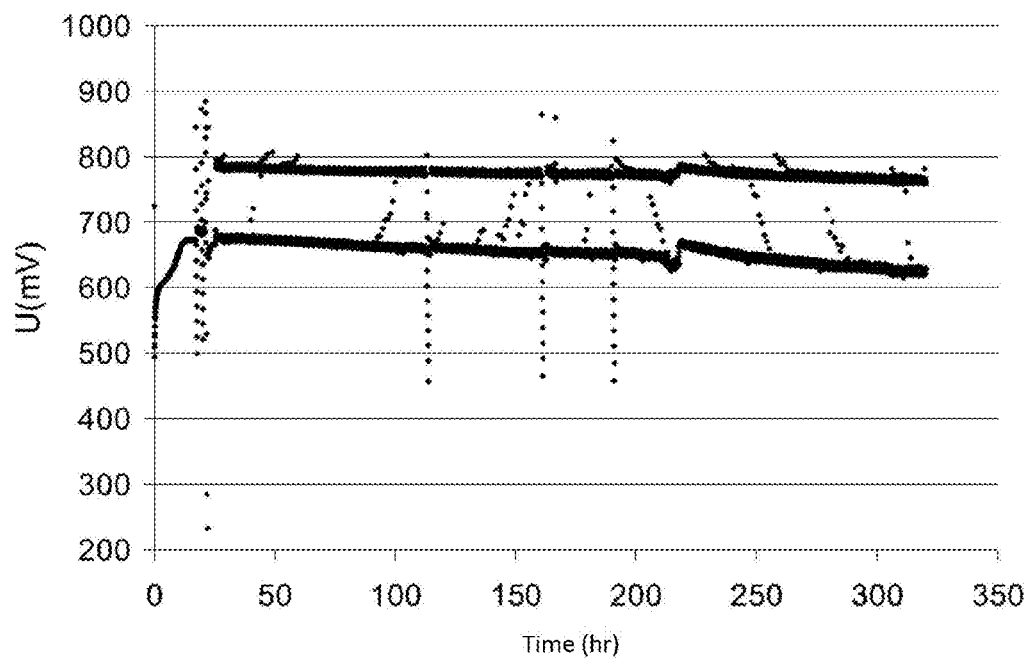

The last tested MEA has a structure in two layers, the first layer (in contact with the membrane after assembly) being identical to the active cathode layer of MEA [2] with a 0.17 mg/cm$^2$ load with respect to the geometric surface of the electrode, the second layer being only formed of carbon and ionomer. This method provides an average electrode composition identical to that of MEA [3] and MEA [4] but with a platinum distribution equivalent to that of MEA [2] (and thus limited in a small thickness with a ratio of the platinum load to the pore volume unchanged across this thickness). The study of FIG. 8 shows that MEA [5] behaves like MEA [2] (with a slope of the same order and greater than the slope obtained with MEA [3] and MEA [4]). This enables to confirm the preponderance of the ratio of the platinum load at the pore scale to the pore volume for the performance durability.

To highlight the benefit of the present invention even for very small loads, a new MEA, MEA [6], has been formed with a load of 0.12 mg/cm$^2$ with respect to the geometric surface of the electrode, the ink used to form the electrodes having been formulated in the same way as the others but only with a larger carbon rate, this to obtain a more lightly loaded active layer, still with the same thickness.

Figure 9:
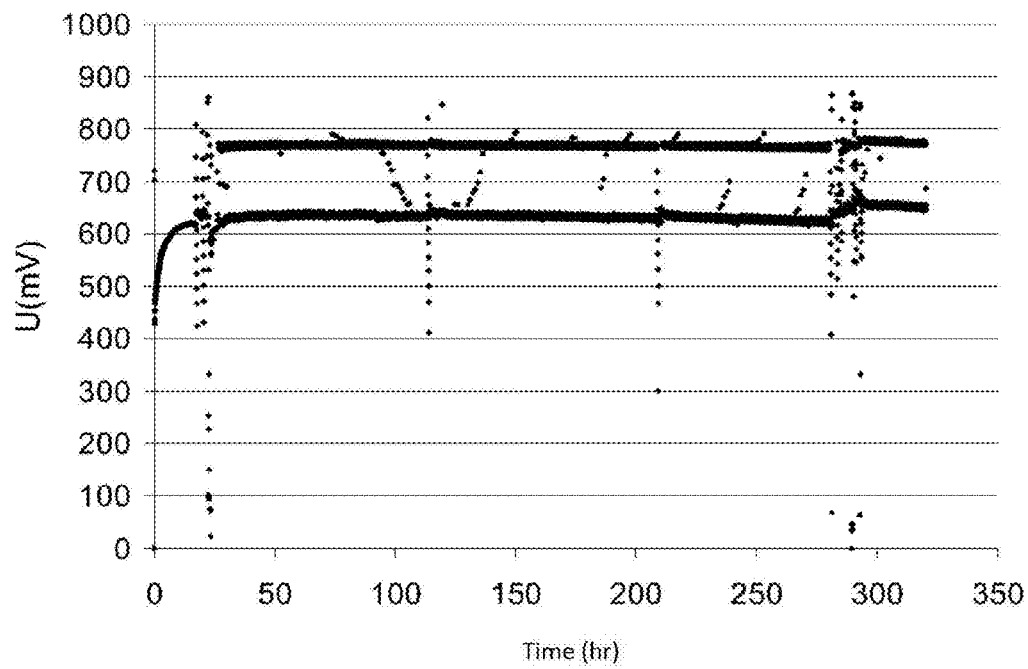

The study of the curve shown in FIG. 9 shows that, even if the performance is slightly decreased, the behavior of MEA [6] is very stable, with a platinum load more than four times smaller than that of MEA [1]. This last test clearly indicates that, in this case, the durability of the performance, instead of being linked to the amount of platinum, depends on the ratio of the platinum load at the pore scale to the pore volume.

The invention claimed is:

1. An electrode for an electrochemical system formed by an active layer comprising:
   pores;
   at least one catalyst;
   at least one ionomer;
   electrically-conductive particles,
content of catalyst per pore ranging between 30 and 500 mg/cm$^3$ with respect to pore volume.

2. The electrode of claim 1, wherein the catalyst content per pore ranges between 100 and 200 mg/cm$^3$.

3. The electrode of claim 1, wherein thickness of the active layer ranges between 10 and 20 micrometers.

4. The electrode of claim 1, wherein the catalyst is based on platinum.

5. The electrode of claim 1, wherein the catalyst comprises platinized carbon.

6. The electrode of claim 1, wherein amount of catalyst ranges between 0.03 mg/cm$^2$ and 0.25 mg/cm$^2$ with respect to a geometric surface of the electrode.

7. The electrode of claim 1, wherein total volume of the pores ranges between 0.0005 cm$^3$/cm$^2$ and 0.0012 cm$^3$/cm$^2$ with respect to a geometric surface of the electrode.

8. The electrode of claim 1, wherein the electrically-conductive particles are selected from the group consisting of carbon black, carbon fibers, carbon nanotubes, a mixture thereof, and any other conductive pigment.

9. A cathode of an electrochemical system, comprising the electrode of claim 1.

10. A membrane-electrode assembly (MEA) of an electrochemical system, comprising the electrode of claim 1.

11. A method for manufacturing the electrode of claim 1, comprising: deposition of a catalytic ink comprising at least one catalyst, at least one ionomer, and electrically-conductive particles.

12. The electrode of claim 1, wherein the electrochemical system comprises a fuel cell.

13. The electrode of claim 5, wherein the catalyst comprises platinized carbon nanoparticles.

14. The electrode of claim 7, wherein the total volume of the pores comprises 0.001 cm$^3$/cm$^2$ with respect to the geometric surface of the electrode.

15. An electrode for an electrochemical system formed by an active layer comprising:
- pores;
- at least one catalyst;
- at least one ionomer;
- electrically-conductive particles, content of catalyst per pore ranging between 30 and 500 $mg/cm^3$ with respect to pore volume, wherein amount of catalyst ranges between 0.03 $mg/cm^2$ and 0.25 $mg/cm^2$ with respect to a geometric surface of the electrode, and wherein total volume of the pores ranges between 0.0005 $cm^3/cm^2$ and 0.0012 $cm^3/cm^2$ with respect to a geometric surface of the electrode.

\* \* \* \* \*